(12) United States Patent
Liu et al.

(10) Patent No.: US 11,863,065 B2
(45) Date of Patent: Jan. 2, 2024

(54) POWER MODULE AND METHOD FOR CONTROLLING THE SAME, THREE-PHASE POWER SYSTEM AND METHOD FOR CONTROLLING THE SAME

(71) Applicant: Delta Electronics (Shanghai) Co.,Ltd., Shanghai (CN)

(72) Inventors: Hong Liu, Shanghai (CN); Wen Zhang, Shanghai (CN); Dan Wang, Shanghai (CN); Cheng Lu, Shanghai (CN); Hongyang Wu, Shanghai (CN)

(73) Assignee: DELTA ELECTRONICS (SHANGHAI) CO., LTD., Shanghai (CN)

(*) Notice: Subject to any disclaimer, the term of this patent is extended or adjusted under 35 U.S.C. 154(b) by 109 days.

(21) Appl. No.: 17/658,658

(22) Filed: Apr. 11, 2022

(65) Prior Publication Data
US 2022/0368219 A1 Nov. 17, 2022

(30) Foreign Application Priority Data
May 12, 2021 (CN) .......................... 202110517637.8

(51) Int. Cl.
*H02M 1/42* (2007.01)
*H02M 3/335* (2006.01)
*H02M 1/00* (2006.01)

(52) U.S. Cl.
CPC ..... *H02M 1/4208* (2013.01); *H02M 3/33584* (2013.01); *H02M 1/007* (2021.05)

(58) Field of Classification Search
CPC . H02M 1/007; H02M 1/4208; H02M 3/33584
See application file for complete search history.

(56) References Cited

U.S. PATENT DOCUMENTS 10,153,710 B1 * 12/2018 Barbosa .................. H02M 7/23
10,601,308 B2    3/2020 Haga
(Continued)

FOREIGN PATENT DOCUMENTS

| CN | 100521442 C | 7/2009 |
| CN | 104811054 A | 7/2015 |
| CN | 107546844 B | 10/2020 |

OTHER PUBLICATIONS

Huang Long et al., "Flexible Mode Bridgeless Boost PFC Rectifier With High Efficiency Over a Wide Range of Input Voltage", IEEE Transactions on Power Electronics, Institute of Electrical and Electronics Engineers, USA, vol. 32, No. 5, May 2017, pp. 3513-3524.

*Primary Examiner* — Gary A Nash
(74) *Attorney, Agent, or Firm* — CKC & Partners Co., LLC

(57) ABSTRACT

A method for controlling a power module includes: configuring N cells in cascade connection, where N is a positive integer equal to or greater than 2, each cell comprising a bidirectional switching unit and a non-controlled rectifier bridge, the bidirectional switching unit being connected to central points of two bridge arms of the non-controlled rectifier bridge; controlling each cell to operate in one of three operating modes of a modulation mode, a bypass mode and a non-controlled rectifying mode, wherein in the N cells, m1 cells operate in the bypass mode, where $0 \leq m1 \leq M1$, m2 cells operate in the non-controlled rectifying mode, where $0 \leq m2 \leq M2$, m3 cells operate in the modulation mode and can realize power factor correction, where $0 < m3$; wherein $m1+m2+m3=N$, M1 is the allowable number of cells for bypass in the system, and M2 is the allowable number of cells for non-controlled rectification in the system.

20 Claims, 12 Drawing Sheets

(56) References Cited

U.S. PATENT DOCUMENTS

| | | | |
|---|---|---|---|
| 2013/0121042 A1* | 5/2013 | Gan | H02M 7/49 363/37 |
| 2013/0175971 A1* | 7/2013 | Har-Shai | H02J 7/00 320/101 |
| 2016/0072398 A1 | 3/2016 | Deboy | |
| 2018/0183335 A1* | 6/2018 | Fan | H02M 3/01 |
| 2019/0052177 A1* | 2/2019 | Lu | H02M 7/797 |
| 2020/0006970 A1* | 1/2020 | Chen | H02M 1/36 |

* cited by examiner

300

┌─────────────────────────────────────────────────────────────┐
│ configuring N cells in cascade connection, where N is a positive integer │
│ equal to or greater than 2, each cell comprising a bidirectional switching unit │     S31
│ and a non-controlled rectifier bridge, the bidirectional switching unit being │
│ connected to central points of two bridge arms │
│ of the non-controlled rectifier bridge │
└─────────────────────────────────────────────────────────────┘

↓

┌─────────────────────────────────────────────────────────────┐
│ controlling each cell to operate in one of three operating modes of a │
│ modulation mode, a bypass mode, and a non-controlled rectifying mode, │
│ wherein among the N cells, m1 cells operate in the bypass mode, │      S32
│ where $0 \leq m1 \leq M1$; m2 cells operate in the non-controlled rectifying mode, │
│ where $0 \leq m2 \leq M2$; m3 cells operate in the modulation mode and can │
│ realize power factor correction, where $0 < m3$; wherein $m1+m2+m3=N$, │
│ M1 is the number of cells allowing bypass in the system, and M2 is │
│ the number of cells allowing non-controlled rectification in the system │
└─────────────────────────────────────────────────────────────┘

Fig. 3

POWER MODULE AND METHOD FOR CONTROLLING THE SAME, THREE-PHASE POWER SYSTEM AND METHOD FOR CONTROLLING THE SAME

CROSS REFERENCE TO RELATED APPLICATION

This application claims priority from Chinese Patent Applications No. 202110517637.8, filed on May 12, 2021, which are hereby incorporated by reference for all purposes as if fully set forth herein.

BACKGROUND OF THE INVENTION

1. Field of the Invention

The invention relates to the power electronic technology, and particularly to a power module and a method for controlling the same, and a three-phase power system and a method for controlling the same.

2. Related Art

A solid-state-transformer (SST), which is also referred to as a power electronic transformer, usually relates to a device for directly converting a medium or high voltage grid voltage into a low voltage output via a power electronic circuit and a high-frequency isolating transformer. It has significant advantages of a small volume and light weight and has a wide application value in application scenarios such as power distribution networks, data centers, and charging stations.

Generally, an SST comprises an AC-DC stage and a DC-DC stage. In conventional applications, the SST is often applied as a one-way power system in the data centers and charging stations. That is, the power only flows from the power grid to a load, and does not flow from the load to the power grid. In such a one-way application, to save cost, the AC-DC stage often uses a power factor correction (PFC) circuit.

FIG. 1A illustrates a single-phase PFC-type SST comprised of N cells, such as Cell 1 to Cell N. Inputs of the AC-DC stages of these cells Cell 1 to Cell N are cascaded, and outputs of the DC-DC stages are connected in parallel. In the one-way application, the AC-DC stage often adopts a PFC circuit shown in FIG. 1B or 1C or 1D. For saving cost, currently, a Totem-pole PFC circuit shown in FIG. 1B is widely used. To improve the reliability of the system, bidirectional switches are often added at an AC side, such as a "bidirectional switch+Totem-pole" scheme shown in FIG. 1E, wherein when one cell has a fault, the bidirectional switch of that cell is turned on, to bypass that cell while keep other cells operating stably.

The problem of the conventional one-way PFC-type SST is that to enhance the reliability of the system each cell shall be mounted with one bypass switch additionally, which is also expensive, resulting in an increased cost of the entire system.

SUMMARY OF THE INVENTION

An object of the invention is to provide a power module and a method for controlling the same, and a three-phase power system and a method for controlling the same, which can solve one or more disadvantages of the prior art.

To realize the above object, according to one embodiment of the invention, the invention provides a method for controlling a power module, comprising:
configuring N cells in cascade connection, where N is a positive integer equal to or greater than 2, each cell comprising a bidirectional switching unit and a non-controlled rectifier bridge, the bidirectional switching unit connected to central points of two bridge arms of the non-controlled rectifier bridge;
controlling each cell to operate in one of three operating modes of a modulation mode, a bypass mode, and a non-controlled rectifying mode, wherein in the N cells, the m1 cells operate in the bypass mode, where $0 \leq m1 \leq M1$; the m2 cells operate in the non-controlled rectifying mode, where $0 \leq m2 \leq M2$; the m3 cells operate in the modulation mode, and can realize power factor correction, where $0 < m3$; wherein $m1+m2+m3=N$, M1 is the number of cells allowing bypass in the system, and M2 is the number of cells allowing non-controlled rectification in the system.

To realize the above object, the invention further provides a power module, comprising: N cells in cascade connection, where N is a positive integer equal to or greater than 2, each cell comprising a bidirectional switching unit and a non-controlled rectifier bridge, the bidirectional switching unit connected to central points of two bridge arms of the non-controlled rectifier bridge; wherein each cell can operate in one of three operating modes of a modulation mode, a bypass mode and a non-controlled rectifying mode, and the cells operating in the modulation mode can realize power factor correction.

To realize the above object, the invention still further provides a three-phase power system, comprising:
three power modules are connected to three phases of a three-phase power supply through a Y connection manner or an angle connection manner.

To realize the above object, the invention even further provides a method for controlling a three-phase power system, comprising:
configuring three power modules connected to three phases of a three-phase power supply through a Y connection manner;
when the power module correspondingly connected to one phase has cells operating in the non-controlled rectifying mode, injecting a zero-sequence voltage into AC ports of the power modules correspondingly connected to another two phases.

The power module of the invention forms a cascade circuit through N cells in cascade connection, and each cell of the cascade circuit is an HPFC circuit comprising the bidirectional switching unit and the non-controlled rectifier bridge. Moreover, the invention can realize power factor correction (PFC) and can multiplex bypass switches (i.e., switches in a bidirectional switching unit also may function to bypass) by controlling the switches in the bidirectional switching unit, thereby reducing cost and improving reliability.

The invention further provides a three-phase power system based on the cascade circuit and provides a fault-tolerant control method suitable for the cascade circuit, and when the bidirectional switching unit of one cell has an open circuit fault, the fault-tolerant operation capability of the system can be enhanced by injecting the zero-sequence voltage to have a good current waveform.

The invention is applied to a medium voltage power grid system through the cascade circuit, and the switches in the bidirectional switching unit also function to bypass, so the invention has a relatively large advantage.

The additional aspects and advantages of the invention are partially explained in the below description, and partially becoming apparent from the description, or can be obtained through the practice of the invention.

BRIEF DESCRIPTION OF THE DRAWINGS

The exemplary embodiments are described in detail with reference to the accompanying drawings, through which the above and other features and advantages of the invention will become more apparent.

FIG. 3 is a flow diagram of a method for controlling a power module according to the invention.

DETAILED EMBODIMENTS OF THE INVENTION

Figure 1A:
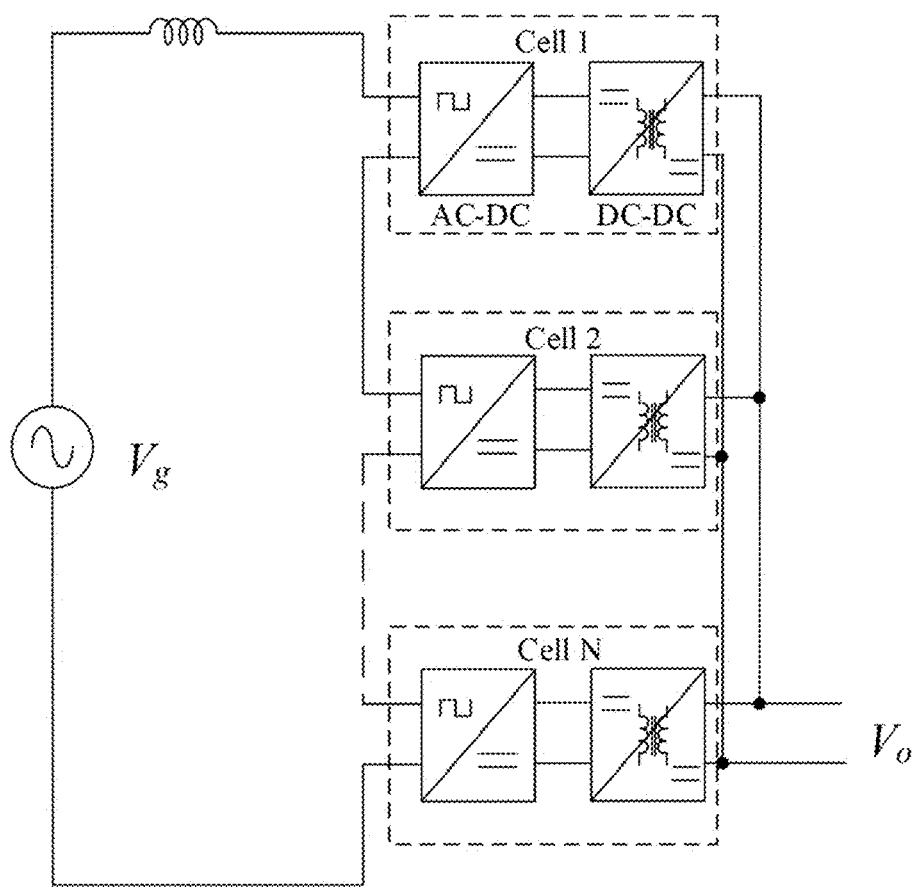
FIG. 1A is a structural diagram of a one-way PFC-type SST of the conventional power system.
Figure 1B:
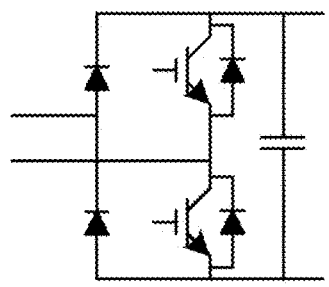
FIGS. 1B-1D are structural diagrams of a PFC circuit at an AC-DC stage in FIG. 1A, respectively.
Figure 1C:
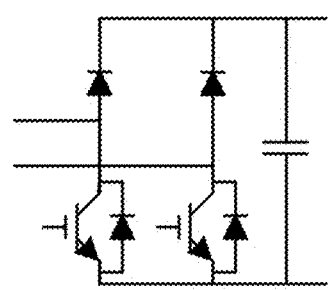
Figure 1D:
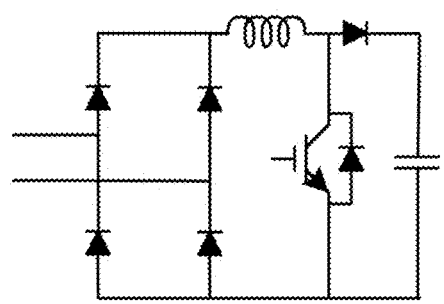

The exemplary embodiments will now be described more fully with reference to the accompanying drawings. However, the exemplary embodiments can be implemented in various forms and shall not be understood as being limited to the embodiments set forth herein; on the contrary, these embodiments are provided so that this invention will be thorough and complete, and the conception of exemplary embodiments will be fully conveyed to those skilled in the art. In the drawings, the same reference sign denotes the same or similar structure, so their detailed description will be omitted.

When factors/components/the like described and/or illustrated here are introduced, the phrases "one", "a(an)", "the", "said" and "at least one" refer to one or more factors/components/the like. The terms "include", "comprise" and "have" refer to an open and included meaning, and refer to additional factors/components/the like, in addition to the listed factors/components/the like. The embodiments may use relative phrases, such as, "upper" or "lower" to describe a relative relation of one signed component over another component. It shall be understood that if the signed device reverses to turn upside down, the described component on an "upper" side will become a component on a "lower" side. In addition, the terms "first", "second" and the like in the claims are only used as signs, instead of numeral limitations to objects.

Figure 2:
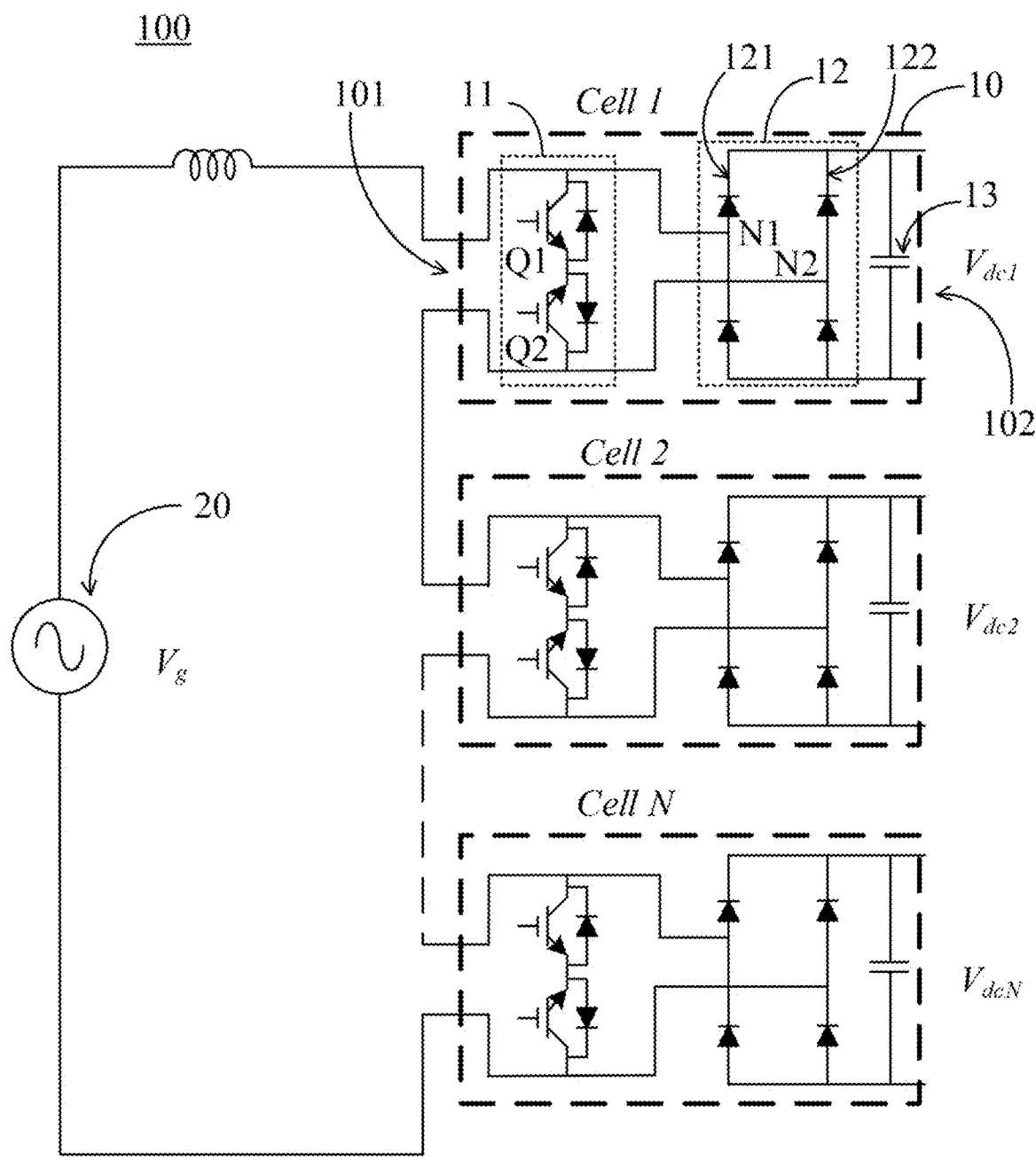
FIG. 2 is a structural diagram of a circuit of a power module according to a first preferable embodiment of the invention.

FIG. 2 illustrates a circuit configuration of a power module 100 according to a first preferable embodiment of the invention. The power module 100, for example, may be cascading applied to a medium voltage power grid system, but the invention is not limited thereto. In the embodiment of FIG. 2, the power module 100 may comprise N cells 10 in cascade connection, such as the cells Cell 1, Cell 2 . . . and Cell N shown in the figure, where N is a positive integer equal to or greater than 2. Each cell 10 may comprise a first end 101 and a second end 102. The first ends 101 of the N cells 10 are cascaded and may be further connected to a power supply 20. The power supply 20, for example, may be, but not limited to an AC power grid, and may provide a voltage $V_g$. The second ends 102 of the N cells 10, for example, may be DC output ends, and connected to a DC load, respectively, and the respective DC output ends may be at voltages $V_{dc1}$, $V_{dc2}$ . . . and $V_{dCN}$.

Hereinafter taking the cell Cell 1 as an example, a specific circuit of the respective cells in the invention is explained in detail. In the invention, each cell 10 is an HPFC circuit and comprises a bidirectional switching unit 11 and a non-controlled rectifier bridge 12, wherein the bidirectional switching unit 11 is connected to central points N1 and N2 of two bridge arms 121 and 122 of the non-controlled rectifier bridge 12. In this embodiment, the bidirectional switching unit 11, for example, may comprise two IGBTs having a body diode and connected in series reversely, i.e., comprising switches Q1 and Q2. However, it can be understood that in other embodiments, the bidirectional switching unit 11 also may comprise two IGBTs without a body diode and connected in parallel, but the invention is not limited thereto. In other embodiments, each cell 10 may further comprise a first capacitor 13 and may be connected in parallel to a DC end of the non-controlled rectifier bridge 12. Circuit configurations of the cells Cell 2 . . . and Cell N are the same as that of the cell Cell 1, so the details are not described here.

In the invention, since the circuit in which a bidirectional switching unit 11 is added between the central points N1 and N2 of the two bridge arms 121 and 122 of the non-controlled rectifier bridge 12 is in an H shape and the circuit can realize Power Factor Correction (PFC), it may be referred to as an "HPFC circuit". The invention enables the HPFC circuit to realize the Power Factor Correction (PFC) by regulating duty cycles of the switches (e.g., the switches Q1 and Q2 in the embodiment of FIG. 2) in the bidirectional switching unit 11.

In particular, each cell 10 can operate in one of three operating modes of a modulation mode, a bypass mode, and a non-controlled rectifying mode. When cell 10 is operating in the modulation mode, its bidirectional switching unit 11 and non-controlled rectifier bridge 12 operate simultaneously to realize the Power Factor Correction (PFC). When cell 10 is operating in the bypass mode, its bidirectional switching unit 11 is turned on to bypass the non-controlled rectifier bridge 12. When cell 10 is operating in the non-controlled rectifying mode, its bidirectional switching unit 11 is turned off and only the non-controlled rectifier bridge 12 is operating to rectify.

The cells in the power module of the invention adopt the HPFC circuit configuration with the bypass function and the PFC function multiplexed, thereby reducing cost as compared to the "bidirectional switch+Totem-pole" scheme in the prior art. Moreover, the non-controlled rectifier bridge does not have the problem of direct conduction, which may improve the reliability of the system. Meanwhile, the introduction of the non-controlled rectifying mode enhances the fault-tolerant control capability of the system.

Further, in combination with FIG. 2, FIG. 3 illustrates a method 300 for controlling a power module according to the invention, comprising:

step S31, configuring N cells 10 in cascade connection, where N is a positive integer equal to or greater than 2, each cell 10 comprising a bidirectional switching unit 11 and a non-controlled rectifier bridge 12, the bidirectional switching unit 11 being connected to central points N1 and N2 of two bridge arms 121 and 122 of the non-controlled rectifier bridge 12;

step S32, controlling each cell 10 to operate in one of three operating modes of a modulation mode, a bypass mode, and a non-controlled rectifying mode, wherein among the N cells 10, m1 cells operate in the bypass mode, where 0≤m1≤M1; m2 cells operate in the non-controlled rectifying mode, where 0≤m2≤M2; m3 cells operate in the modulation mode and can realize power factor correction, where 0<m3; wherein m1+m2+m3=N, M1 is the number of cells allowing bypass in the system, and M2 is the number of cells allowing non-controlled rectification in the system.

In the embodiment of FIG. 2, the M1, for example, may be determined by a ratio of a grid voltage of the medium voltage power grid system to a port withstanding voltage of a single cell. For example, when a total grid voltage is 10 kV, assuming that the rated voltage of each cell is 1 kV and the system has N=12 cells cascaded, the number allowing bypass is M1=2. The M2, for example, may be determined by an allowable current distortion degree of the system and not exceed N/2.

Figure 1E:
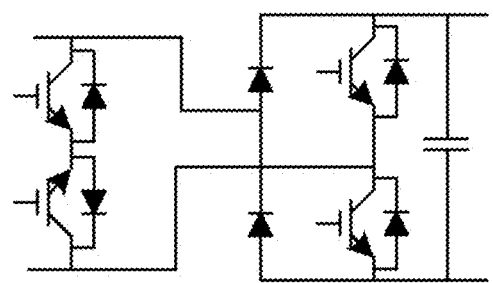
FIG. 1E is a structural diagram of a PFC circuit of a "bidirectional switch+Totem-pole" scheme at the AC-DC stage in FIG. 1A.

By controlling the switches in the bidirectional switching unit 11, the invention can realize power factor correction (PFC) and can multiplex bypass switches (i.e., switches in the bidirectional switching unit 11 may also have function of bypass). With the multiplexing of the bypass function and the PFC function, the present invention reduces cost and improves reliability as compared to the "bidirectional switch+Totem-pole" scheme in the prior art (as shown in FIG. 1E).

Figure 4:
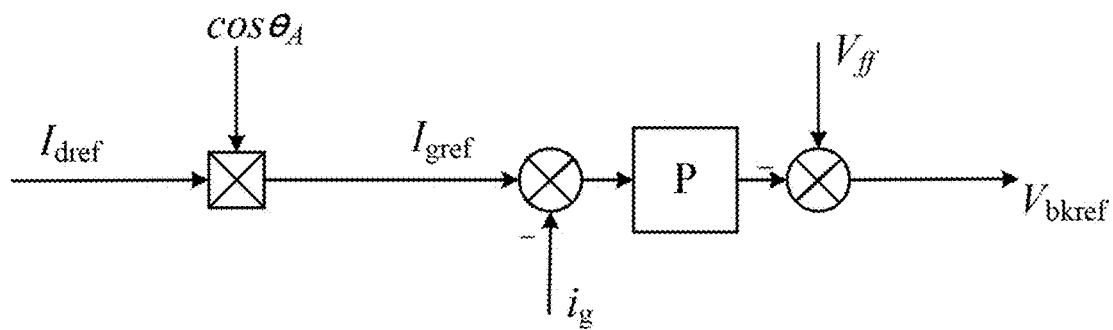
FIG. 4 is a schematic diagram of controlling cells in a modulation mode using a current closed-loop and voltage feedforward according to the invention.

In the invention, further, the cells operating in the modulation mode can eliminate influence by a port voltage of the cells in the non-controlled rectifying mode through a current closed-loop and voltage feedforward control, thereby realizing the PFC function. For example, the current closed-loop and voltage feedforward control shown in FIG. 4 may be adopted. In the figure, $I_{dref}$ is a current reference on a d-axis representing an active power and being set according to needs, $\cos\theta_A$ is a cosine function of an angle of the grid voltage, $I_{gref}$ is an AC reference being synchronized with the grid voltage, $I_g$ is the feedback of a grid current, P is a current proportional controller, $V_{bkref}$ is a modulation voltage reference of the k-th cell in the modulation mode, and $V_{ff}$ is voltage feedforward. A calculating formula of a feedforward voltage $V_{ff}$ is:

$$V_{ff} = \frac{V_g - \text{sign}(i_g)\sum_{h=1}^{m_2} V_{dch}}{N - m_1 - m_2},$$

wherein $V_g$ is a grid voltage, $i_g$ is a grid current, sign is a sign function. That is, when $i_g>0$, sign $(i_g)=1$, when $i_g<0$, sign $(i_g)=-1$, and when $i_g=0$, sign $(i_g)=0$. $V_{dch}$ represents an output voltage of the h-th cell in the non-controlled rectifying mode. In the formula, subscript h represents that the h-th cell is in the non-controlled rectifying mode, and $m_2$ cells in total are in the non-controlled rectifying mode. In the formula, the numerator is the grid voltage minus a total port voltage of the $m_2$ cells in the non-controlled rectifying mode, and denominator $N-m_1-m_2$ represents the number of cells in the modulation mode, i.e., $m_3$, meaning that the cells in the modulation mode averagely distribute a total voltage corresponding to the numerator.

Further, all cells operating in the modulation mode may be modulated by the phase shift of carrier waves. Specifically, a driving signal of the bidirectional switch can be generated by comparing the modulation voltage reference $V_{bkref}$ with the carrier waves. Moreover, as for the $(N-m_1-m_2)$ cells operating in the modulation mode, phases of the carrier waves between the cells may have a phase difference of $2\pi/(N-m_1-m_2)$ sequentially. In other words, phases of the carrier waves between the $m_3$ cells operating in the modulation mode may have a phase difference of $2\pi/m_3$ sequentially.

Figure 5:
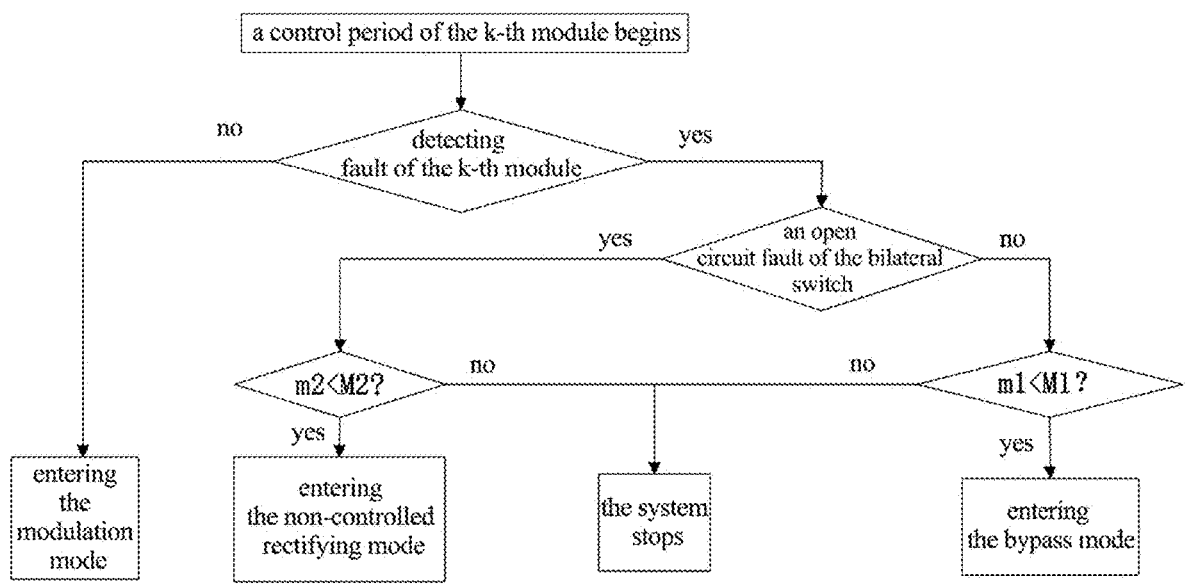
FIG. 5 is a flow diagram of cell fault-tolerant processing of the power module according to the invention.

Further, the invention provides a fault-tolerant control method based on the power module of the cascaded HPFC circuit. FIG. 5 illustrates a flow of fault-tolerant control processing inside a control period of the k-th cell. Among the N cells, as for the k-th cell, after the control period begins, whether the k-th cell itself has a fault, such as faults of DC_Link overvoltage or cell over-temperature, is detected. If no, the k-th cell selects to enter the modulation mode. If yes, the processing is classified according to fault conditions. If it is an open circuit fault of the bidirectional switching unit, the number of cells in the non-controlled rectifying mode in the system is judged. When the number m2 of cells in the non-controlled rectifying mode is less than M2, the k-th cell may select to enter the non-controlled rectifying mode, and the number of cells in the non-controlled rectifying mode is added with 1 (i.e., m2+1), or the system stops. If it is not the open-circuit fault of the bidirectional switching unit, the number of cells in the bypass mode in the system is judged. When the number m1 of cells in the bypass mode in the N cells is less than M1, the k-th cell may select to enter the bypass mode, and the number of cells in the bypass mode is added with 1 (i.e., m1+1), or the system shall stop.

Figure 6:
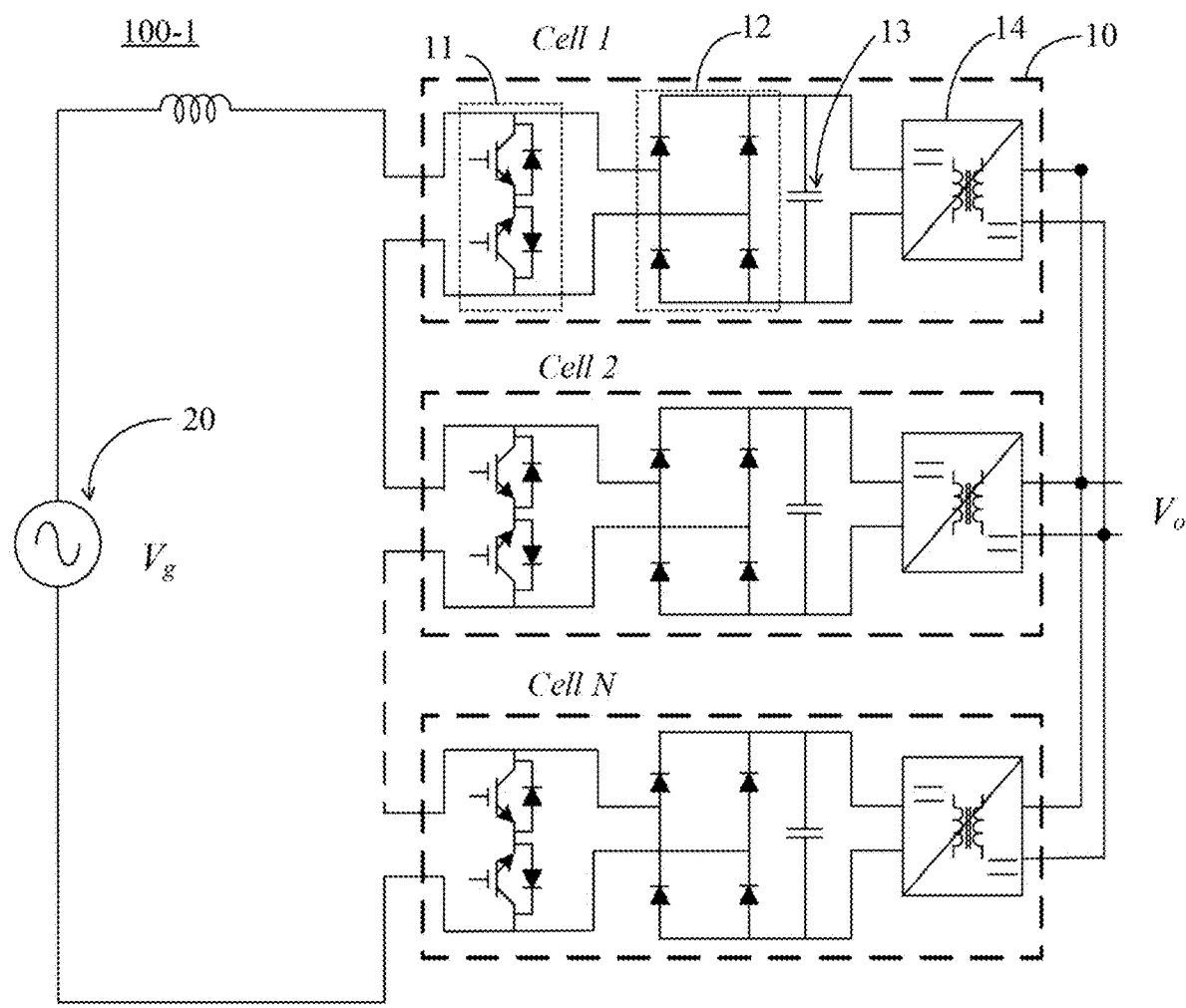
FIG. 6 is a structural diagram of a circuit of a power module according to a second preferable embodiment of the invention, wherein each cell further comprises a DC-DC conversion cell.

FIG. 6 illustrates a circuit configuration of a power module 100-1 according to a second preferable embodiment of the invention, which may form a single-phase SST, for example. In this embodiment, each cell 10 of the power module 100-1 may further comprise a DC-DC conversion cell 14 connected to a DC end of the non-controlled rectifier bridge 12, wherein outputs of the DC-DC conversion cells 14 are connected in parallel to form an output of a total port voltage Vo.

Figure 7:
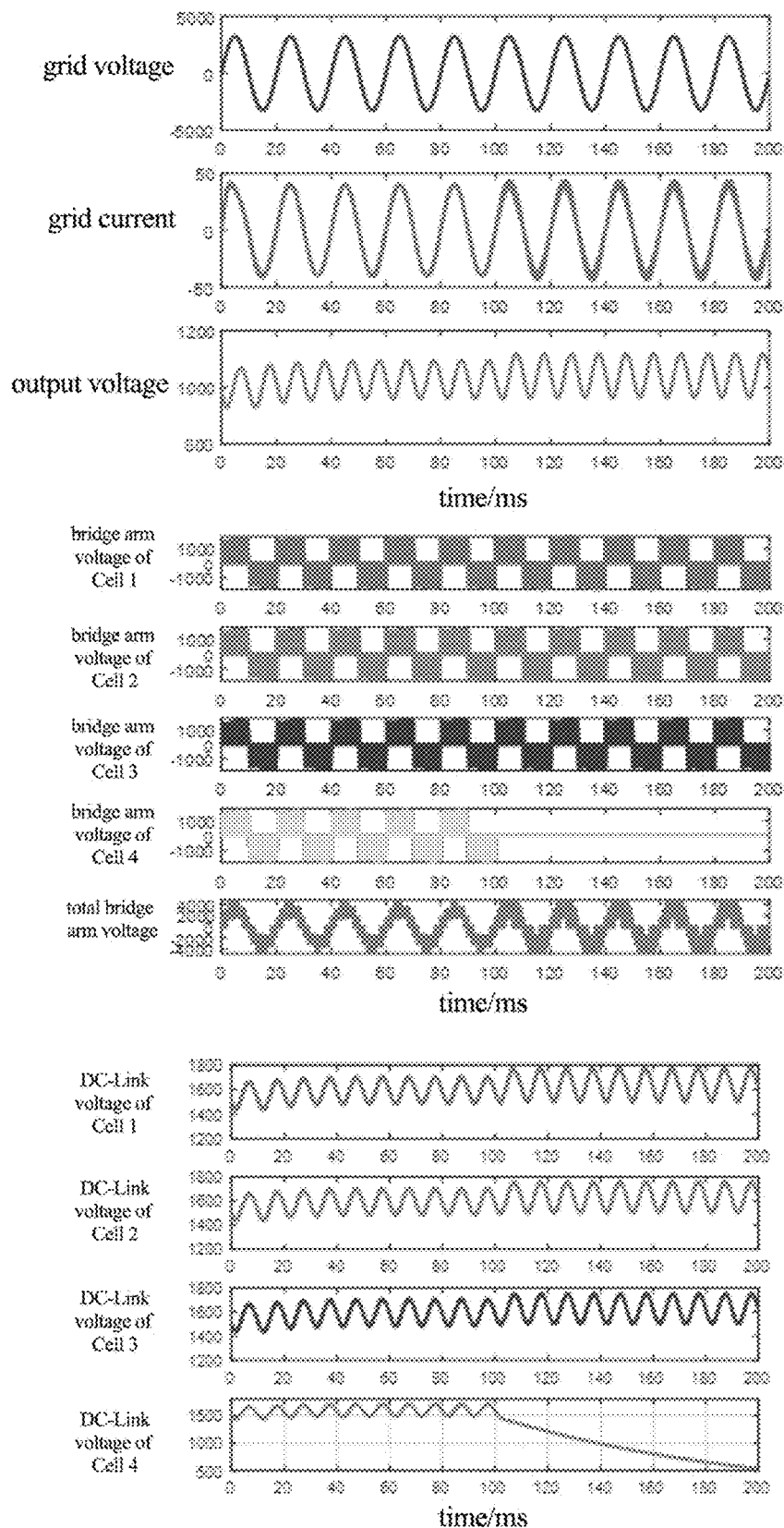
FIG. 7 is a schematic diagram of stimulation waveforms of the respective cells from a modulation mode to a bypass mode in the power module according to the second preferable embodiment of the invention.
Figure 8:
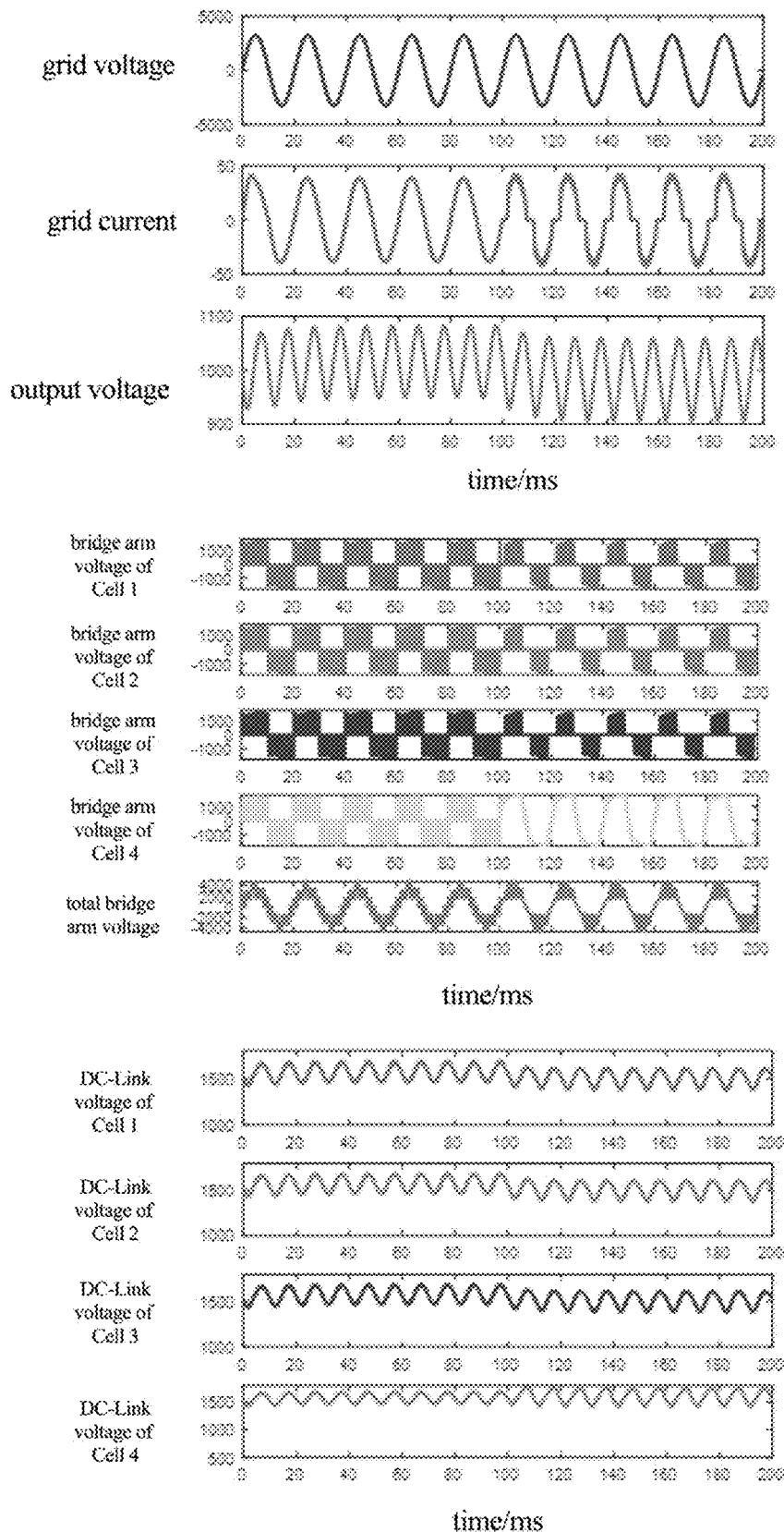
FIG. 8 is a schematic diagram of stimulation waveforms of the respective cells from a modulation mode to a non-controlled rectifying mode in the power module according to the second preferable embodiment of the invention.

For this embodiment, when the bidirectional switching unit 11 in cell 10 has an open circuit fault, a preceding stage AC-DC (e.g., the non-controlled rectifier bridge 12) of cell 10 is in the non-controlled rectifying mode and may perform DC-Link voltage-sharing control through a post stage DC-DC (e.g., the DC-DC conversion cell 14). FIGS. 7 and 8 are simulation conditions of simulation waveforms based on the embodiment of a single-phase SST in the invention. The single-phase SST comprises four cells cascaded, i.e., comprising cells Cell 1 to Cell 4, wherein simulation is provided with a fault bypass of the fourth cell Cell 4, a peak of the grid voltage is 4500V, Vdc=1580V, Vo=980V, the DC-DC conversion cell 14 is an LLC converter, a turns ratio of the transformer is 3:2, a capacitance Cdc of the first capacitor 13 is 100 μF, a capacitance Co of the output capacitor is 500 μF, a switching frequency of AC-DC (i.e., the HPFC circuit) is 5 kHZ, the carrier waves of the four cells are interlaced by 90 degrees, a resonant frequency of the LLC converter is 100 kHZ, a fixed switching frequency is controlled, and an output of the LLC converter is connected with a load of 20Ω resistor.

FIG. 7 is simulation waveforms from the modulation mode to the bypass mode based on the second preferable embodiment of the invention. As can be seen from the waveforms, at about 100 ms, the cell Cell 4, for example, due to fault, enters the bypass mode, because a DC-Link voltage of the cell Cell 4 for exiting operation is decreased, and the DC-Link voltages of other cells (Cell 1 to Cell 3) can substantially operate uniformly and stably. Waveforms of other currents and voltages are substantially normal. It shows the feasibility of switching from the normal modulation mode to the bypass mode using the structure and method of the invention.

FIG. 8 is simulation waveforms from the modulation mode to the non-controlled rectifying mode according to the second preferable embodiment of the invention. As can be seen from the waveforms, at about 100 ms, the cell Cell 4, for example, due to the open circuit fault of the bidirectional switch, enters the non-controlled rectifying mode, and since the cell Cell 4 in the non-controlled rectifying mode stops PWM modulation, a bridge arm voltage is changed from a high-frequency PWM wave to a low-frequency square wave. Moreover, the DC-Link voltages of all cells (Cell 1 to Cell 4) can substantially operate uniformly and stably. Waveforms of other currents and voltages are substantially normal. It shows the feasibility of switching from the normal modulation mode to the non-controlled rectifying mode using the structure and method of the invention.

Figure 9:
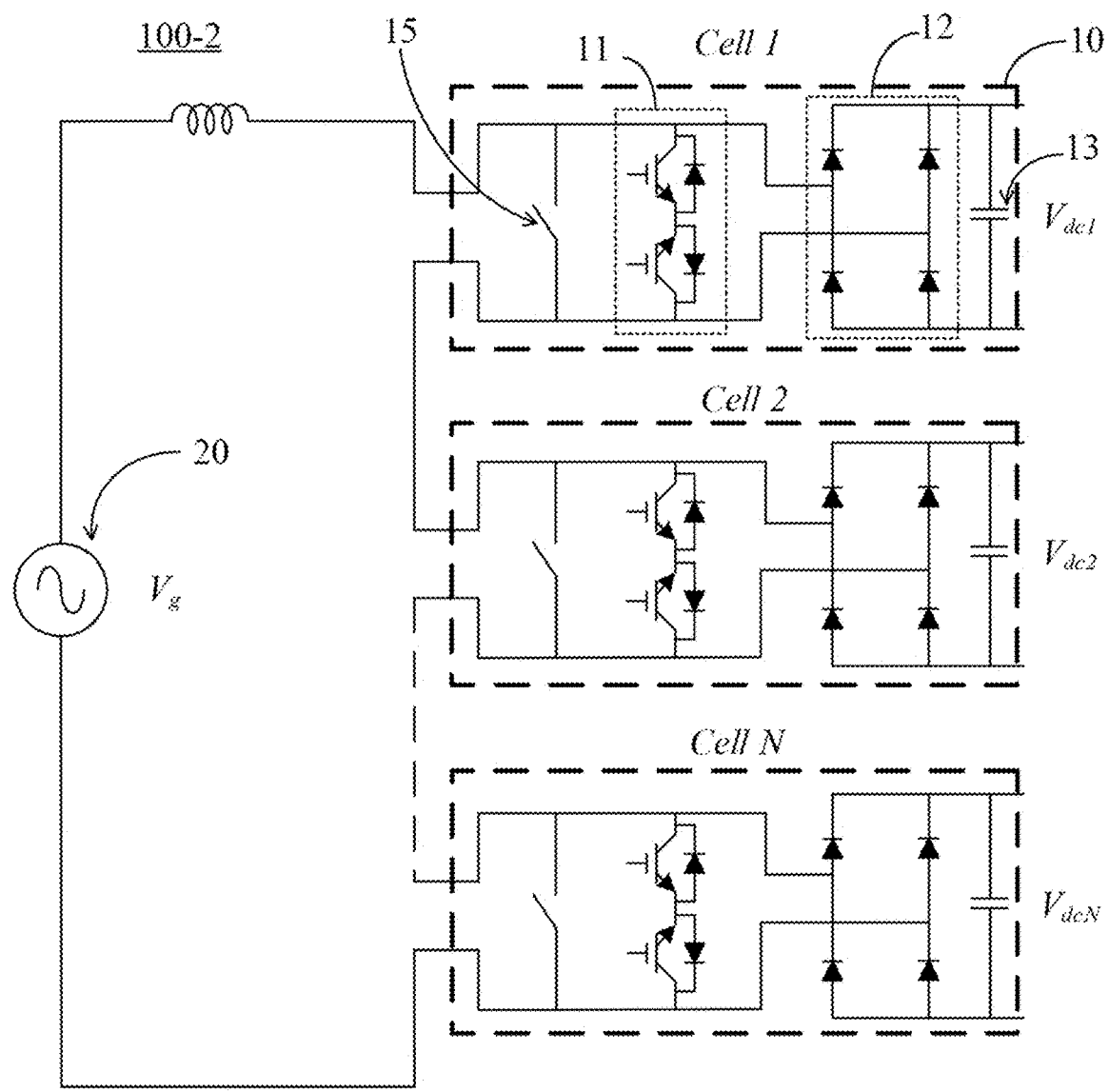
FIG. 9 is a structural diagram of a circuit of a power module according to a third preferable embodiment of the invention, wherein each cell further comprises a relay.

FIG. 9 illustrates a circuit configuration of a power module 100-2 according to a third preferable embodiment of the invention. In this embodiment, a relay 15 is further provided at an AC side of each cell 10. When the switches (IGBTs) of the bidirectional switching unit 11 have an open circuit fault, it is possible to select to turn on the relay 15, such that the corresponding cells enter the bypass mode. Selecting the relay to bypass has a lower loss than selecting the IGBTs of the bidirectional switching unit to bypass. Therefore, when each cell is controlled, for the k-th cell, if there is a fault and a fault type is the open circuit fault of the bidirectional switching unit, the invention may preferably turn on the relay, such that the k-th cell enters the bypass mode.

Figure 10:
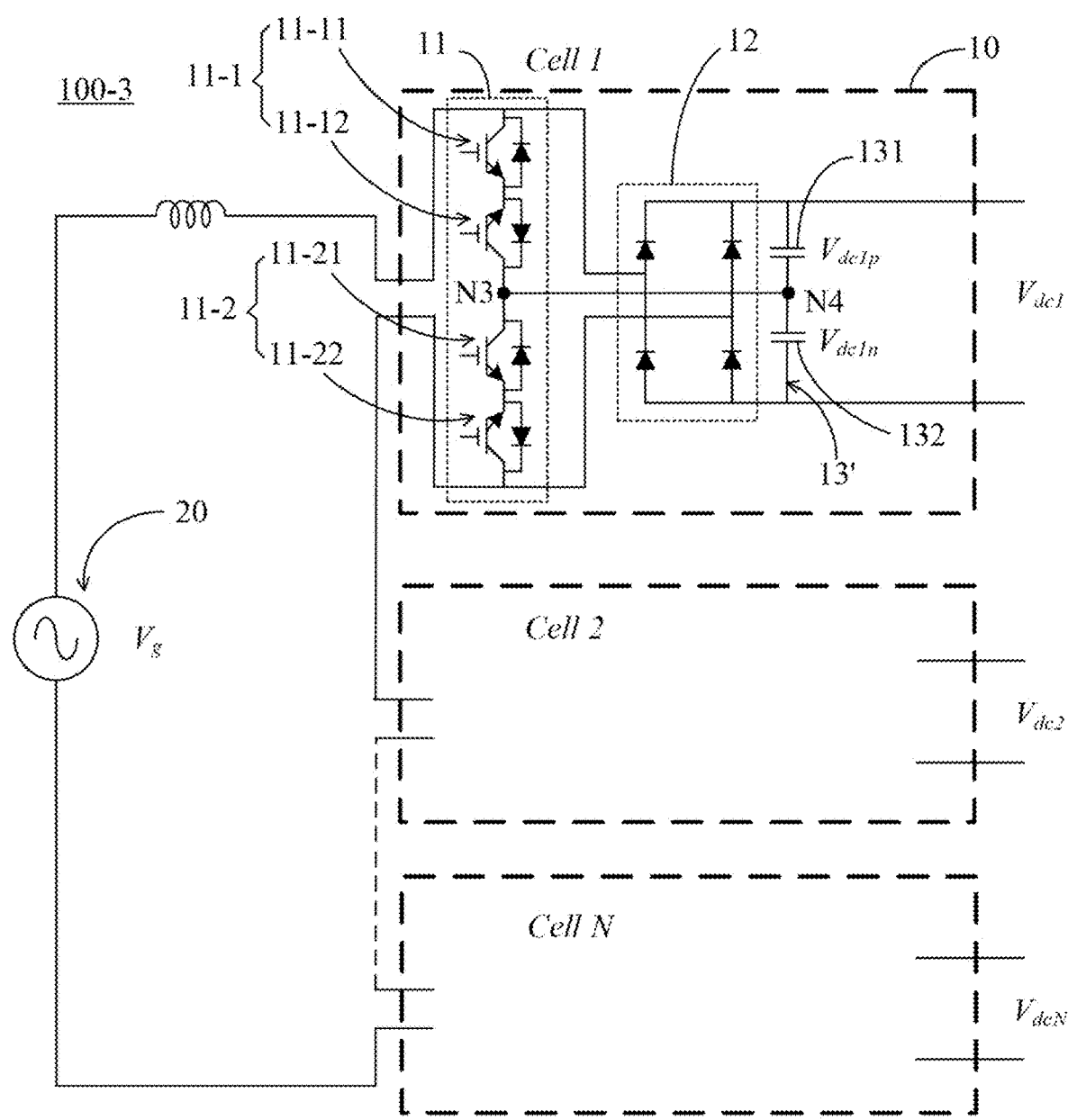
FIG. 10 is a structural diagram of a circuit of a power module according to a fourth preferable embodiment of the invention, wherein a bidirectional switching unit in each cell comprises four IGBTs connected in series.

FIG. 10 illustrates a circuit configuration of a power module 100-3 according to a fourth preferable embodiment of the invention. In this embodiment, each cell 10 further comprises a capacitor branch 13' comprised of a first capacitor 131 and a second capacitor 132 connected in series. The capacitor branch 13' is connected in parallel to a DC end of the non-controlled rectifier bridge 12. The first capacitor 131 has a voltage $V_{dclp}$ across it, and the second capacitor 132 has a voltage $V_{dcln}$ across it. Moreover, the bidirectional switching unit 11 in each cell 10 may comprise a first IGBT 11-11, a second IGBT 11-12, a third IGBT 11-21, and a fourth IGBT 11-22 connected in series, wherein the first IGBT 11-11 and the second IGBT 11-12 are connected in series reversely to form a first switching assembly 11-1, the third IGBT 11-21 and the fourth IGBT 11-22 are connected in series reversely to form a second switching assembly 11-2, and a central point N3 between the first switching assembly 11-1 and the second switching assembly 11-2 are connected to a central point N4 between the first capacitor 131 and the second capacitor 132. In such a way, two IGBTs connected in series can replace one IGBT in the embodiment of FIG. 2, to form the embodiment of a three-level HPFC shown in FIG. 10. This embodiment can reduce the requirement for a withstanding voltage of the single IGBT.

Figure 11:
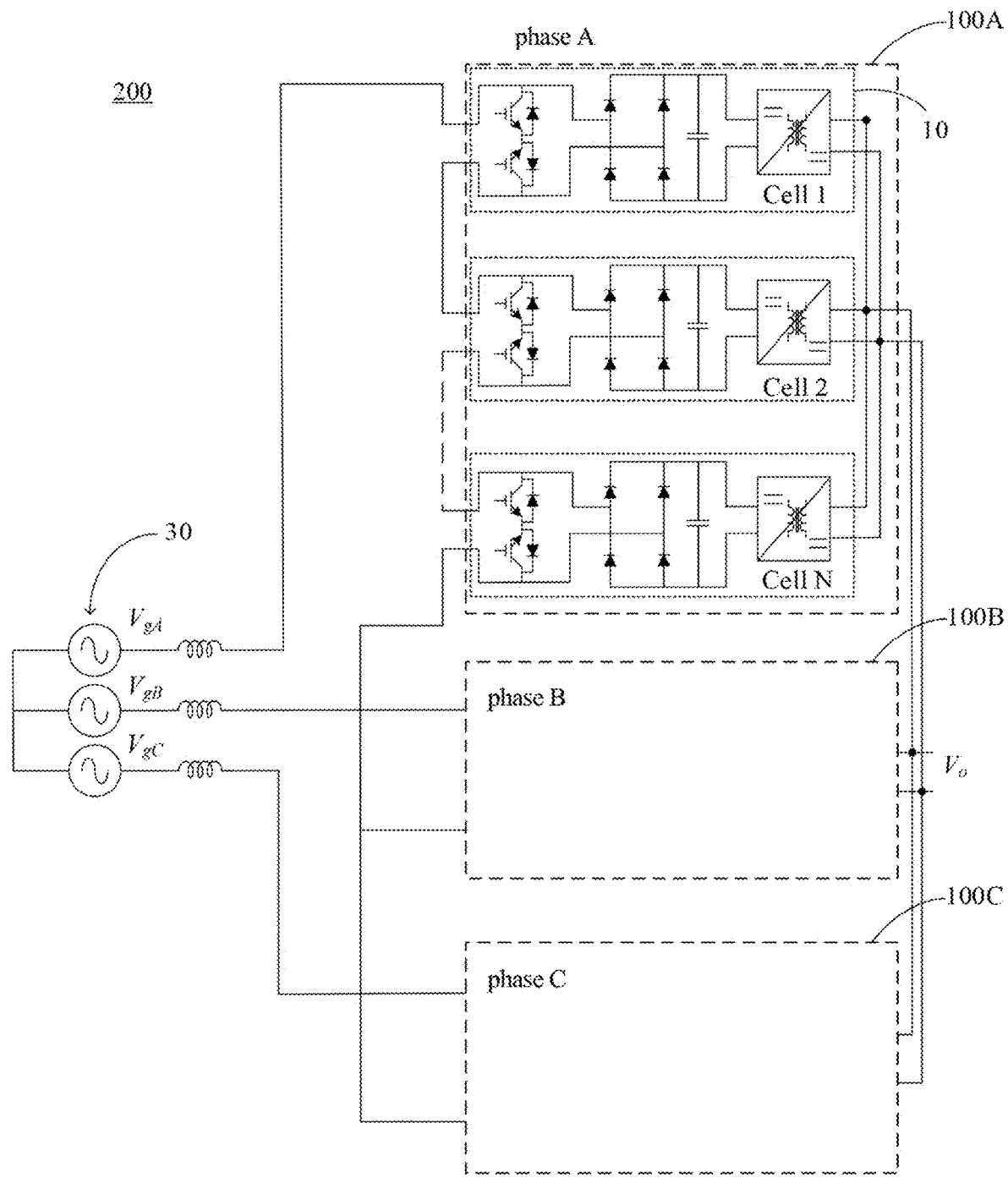
FIG. 11 is a structural diagram of a three-phase power system based on the power module of the invention.

FIG. 11 illustrates a structure of a three-phase power system 200 based on a power module of the invention. The three-phase power system 200 comprises three power modules 100A, 100B, and 100C connected to three phases of a three-phase power supply 30 through a Y connection manner or an angle connection manner. In the embodiment of FIG. 11, the circuit configuration of the three power modules 100A, 100B, and 100C, for example, may be the circuit configuration of FIG. 6, and the three power modules 100A, 100B, and 100C and the three phases ($V_{gA}$, $V_{gB}$, and $V_{gC}$) of the three-phase power supply 30 are connected to form a three-phase SST through the Y connection manner. It can be understood that in other embodiments, the circuit configuration of the three power modules 100A, 100B, and 100C also can be, for example, the configuration of FIG. 2, 9, or 10, or other circuit configurations obtained by modification of the invention, but the invention is not limited thereto.

In the invention, as for the three-phase power system in a Y connection or an angle connection, the fault-tolerant control logic of each phase is the same as that of the single-phase SST, so the details are not described here.

Figure 12:
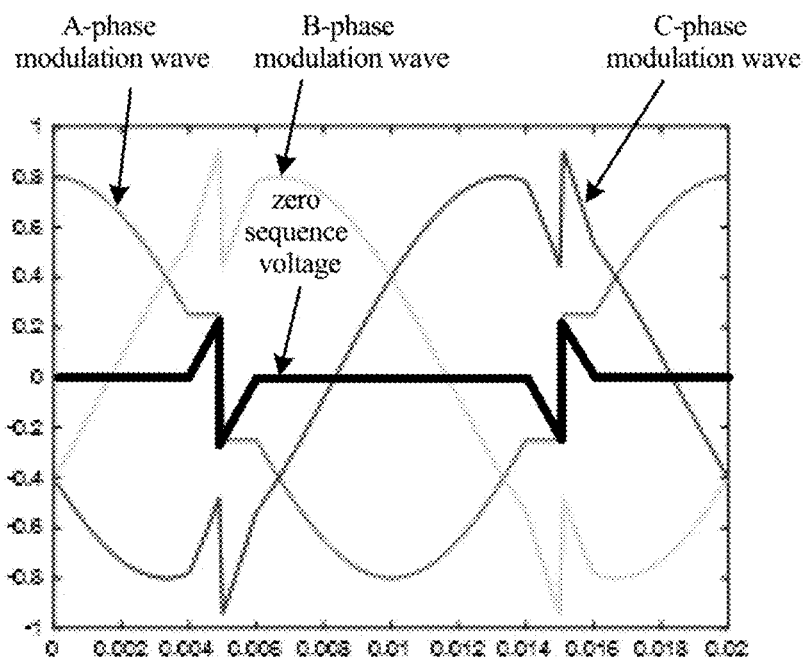
FIG. 12 is a schematic diagram wherein in the three-phase power system of the invention when there is a cell operating in the non-controlled rectifying mode in one phase of the power module, a zero-sequence voltage can be injected into AC ports of the power modules of the other two phases to realize current PFC control function.

In the invention, as for the three-phase power system in a Y connection, when one cell operates in the non-controlled rectifying mode, the current PFC control function can be realized using the method of zero-sequence voltage injection. More specifically, when the power module of one phase has cells operating in the non-controlled rectifying mode, the zero-sequence voltage can be injected into AC ports of the power modules of the other two phases. A schematic diagram of the zero-sequence voltage injection is shown in FIG. 12, assuming that one cell in phase A is in the non-controlled rectifying mode, the voltage of the phase modulation wave cannot be infinitely approximate to zero near a zero-crossing point, and to ensure the current not to distort, the same voltage, i.e., the zero-sequence voltage, shall be injected into the other two phases, such that a line voltage does not include harmonic waves.

Figure 13:
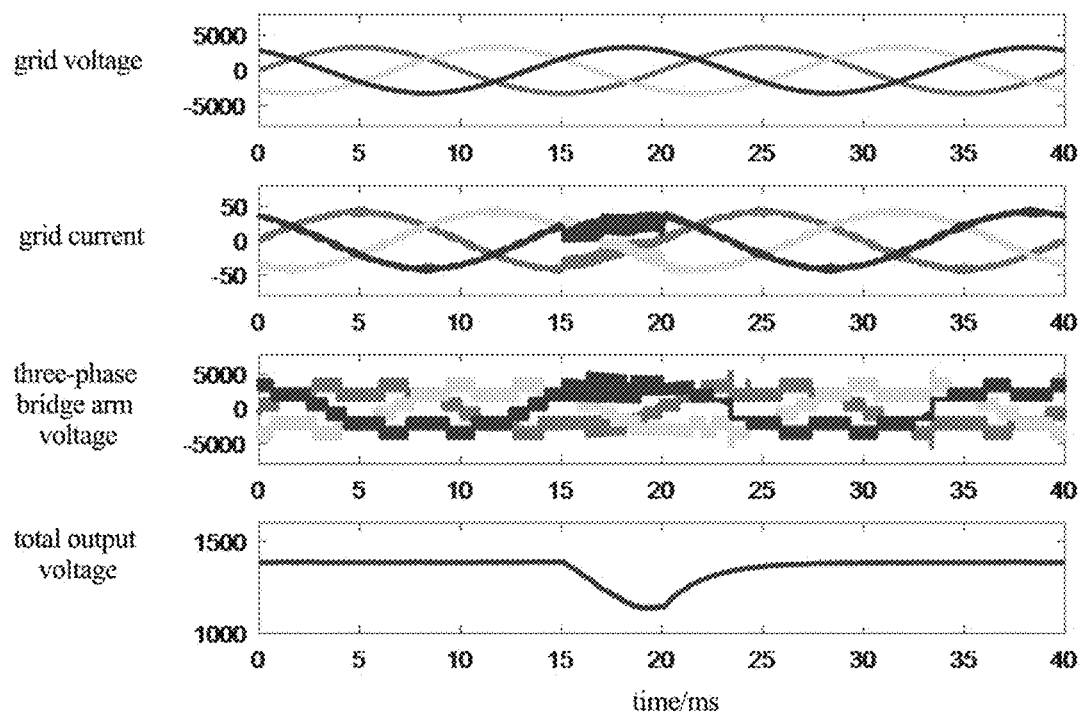
FIG. 13 is a schematic diagram of the stimulation effect based on the three-phase power system of the invention.

The simulation effect based on the embodiment of the three-phase SST in FIG. 11 of the invention is shown in FIG. 13. In this embodiment, simulation conditions are the three-phase SST, each phase having four cells, wherein the bidirectional switching unit of the fourth cell in phase C enters the non-controlled rectifying mode after an open circuit fault at 15 ms, and a time from 15 ms to 20 ms is a transition process of detecting the fault and switching the modes. At this time, since phase-shift angles and control policies of the carrier waves cannot be timely switched, the process has a waveform containing a short section of current distortion. Next, after considering of influence of non-controlled rectifier port voltage and control of the current closed-loop with the zero-sequence voltage injection provided by the invention, the waveform of the current gets back to normal. The simulation effect shows that the zero-sequence voltage injection into the bridge arm voltage enables THD of the waveforms of the circuit to get better, and allows the cells to operate in non-controlled rectification.

To sum up, in the power module and the power system based on the cascaded HPFC circuit provided by the invention, the HPFC circuit may be formed by the bidirectional switching unit and the non-controlled rectifier bridge, wherein the switches in the bidirectional switching unit can multiplex the bypass function and the PFC function and can reduce cost as compared to the existing "bidirectional switch+Totem-pole" scheme. The non-controlled rectifier bridge of the invention does not have the problem of direct conduction and can improve reliability.

The invention further provides the fault-tolerant control method suitable for the cascaded HPFC circuit, and the three-phase SST based on the cascaded HPFC circuit. When the bidirectional switching unit of one cell has the open circuit fault, it is possible to select to enter the non-controlled rectifying mode or the bypass mode. The introduction of the non-controlled rectifying mode can enhance the fault-tolerant control capability of the system.

As for the three-phase power system in a Y connection, when one cell operates in the non-controlled rectifying mode, the invention also can realize the current PFC control function using the method of zero-sequence voltages injection, such that the waveform of the current is good, thereby further enhancing the fault-tolerant control capability of the system, so the invention has a further advantage.

Exemplary embodiments of the invention have been shown and described in detail. It shall be understood that the invention is not limited to the disclosed embodiments. Instead, the invention intends to cover various modifications and equivalent settings included in the spirit and scope of the appended claims.

What is claimed is:

1. A method for controlling a power module, comprising:
configuring N cells in cascade connection, where N is a positive integer equal to or greater than 2, wherein each cell comprises a bidirectional switching unit and a non-controlled rectifier bridge and the bidirectional switching unit is connected to central points of two bridge arms of the non-controlled rectifier bridge; and
controlling each cell to operate in one of three operating modes of a modulation mode, a bypass mode, and a non-controlled rectifying mode, wherein among the N cells, m1 cells operate in the bypass mode, where $0 \leq m1 \leq M1$; m2 cells operate in the non-controlled rectifying mode, where $0 \leq m2 \leq M2$; m3 cells operate in the modulation mode and can realize power factor correction, where $0 < m3$; wherein m1+m2+m3=N, M1 is the number of cells allowing bypass in the system, and M2 is the number of cells allowing non-controlled rectification in the system.

2. The method for controlling a power module according to claim 1, wherein the cells operating in the modulation mode are modulated by phase shift of carrier waves.

3. The method for controlling a power module according to claim 2, wherein phases of the carrier waves between the m3 cells operating in the modulation mode have a phase difference of $2\pi/m3$ sequentially.

4. The method for controlling a power module according to claim 1, wherein the cells operating in the modulation mode further adopt a current closed-loop and voltage feedforward control, wherein a calculating formula of a feedforward voltage is as follows:

$$V_{ff} = \frac{V_g - \text{sign}(i_g)\sum_{h=1}^{m_2} V_{dch}}{N - m_1 - m_2},$$

wherein $V_g$ is a grid voltage, $i_g$ is a grid current, sign is a sign function, and $V_{dch}$ represents an output voltage of the h-th cell in the non-controlled rectifying mode.

5. The method for controlling a power module according to claim 1, wherein controlling each cell further comprises:
for the k-th cell among the N cells, after a control period begins, detecting whether the k-th cell has a fault;
if no, the k-th cell selects to enter the modulation mode;
if yes, and if the fault is an open circuit fault of the bidirectional switching unit and the number of cells in the non-controlled rectifying mode in the N cells is less than M2, the k-th cell selects to enter the non-controlled rectifying mode, otherwise the system stops; and
if yes, and if the fault is not an open circuit fault of the bidirectional switching unit and the number of cells in the bypass mode in the N cells is less than M1, the k-th cell selects to enter the bypass mode, otherwise the system stops.

6. The method for controlling a power module according to claim 5, wherein,
each cell further comprises a relay connected in parallel to the bidirectional switching unit and located at an AC side of the cell;
wherein when controlling each cell:
for the k-th cell, if there is a fault and the fault is the open circuit fault of the bidirectional switching unit, the relay is turned on such that the k-th cell enters the bypass mode.

7. The method for controlling a power module according to claim 1, wherein the power module is cascading applied to a medium voltage power grid system.

8. The method for controlling a power module according to claim 7, wherein the M1 is determined by a ratio of a grid voltage of the medium voltage power grid system to a port withstanding voltage of a single cell, and the M2 is determined by an allowable current distortion degree of the system, where the M2 does not exceed N/2.

9. The method for controlling a power module according to claim 1, wherein,
each cell further comprises a first capacitor connected in parallel to a DC end of the non-controlled rectifier bridge,
wherein the bidirectional switching unit comprises two IGBTs having a body diode connected in series reversely, or the bidirectional switching unit comprises two IGBTs without a body diode connected in parallel.

10. The method for controlling a power module according to claim 1, wherein,
each cell further comprises a capacitor branch comprised of a first capacitor and a second capacitor connected in series, and the capacitor branch is connected in parallel to the non-controlled rectifier bridge;

wherein the bidirectional switching unit comprises a first IGBT, a second IGBT, a third IGBT, and a fourth IGBT connected in series, the first IGBT and the second IGBT being connected in series reversely to form a first switching assembly, the third IGBT and the fourth IGBT being connected in series reversely to form a second switching assembly, and a central point between the first switching assembly and the second switching assembly being connected to a central point between the first capacitor and the second capacitor.

11. The method for controlling a power module according to claim 1, wherein each cell further comprises a DC-DC conversion cell connected to a DC end of the non-controlled rectifier bridge.

12. A power module, comprising:
N cells in cascade connection, where N is a positive integer equal to or greater than 2, wherein each cell comprises a bidirectional switching unit and a non-controlled rectifier bridge, and the bidirectional switching unit is connected to central points of two bridge arms of the non-controlled rectifier bridge;
wherein each cell can operate in one of three operating modes of a modulation mode, a bypass mode, and a non-controlled rectifying mode, and the cells operating in the modulation mode can realize power factor correction.

13. The power module according to claim 12, wherein each cell comprises a first end and a second end, wherein the first ends of the N cells are cascaded and the second ends of the N cells are connected to a DC-DC conversion cell, respectively.

14. The power module according to claim 12, wherein each cell further comprises a relay connected in parallel to the bidirectional switching unit.

15. The power module according to claim 12, wherein the power module is cascaded to a medium voltage power grid system.

16. The power module according to claim 12, wherein, each cell further comprises a first capacitor connected in parallel to a DC end of the non-controlled rectifier bridge,
wherein the bidirectional switching unit comprises two IGBTs having a body diode connected in series reversely, or the bidirectional switching unit comprises two IGBTs without a body diode connected in parallel.

17. The power module according to claim 12, wherein, each cell further comprises a capacitor branch comprised of a first capacitor and a second capacitor connected in series, and the capacitor branch is connected in parallel to the non-controlled rectifier bridge;
wherein the bidirectional switching unit comprises a first IGBT, a second IGBT, a third IGBT, and a fourth IGBT connected in series, the first IGBT and the second IGBT being connected in series reversely to form a first switching assembly, the third IGBT and the fourth IGBT being connected in series reversely to form a second switching assembly, and a central point between the first switching assembly and the second switching assembly being connected to a central point between the first capacitor and the second capacitor.

18. The power module according to claim 12, wherein in the N cells,
if any of the cells do not have a fault, the cell selects to enter the modulation mode;
if any of the cells have a fault, and if the fault is an open circuit fault of the bidirectional switching unit and the number of cells in the non-controlled rectifying mode in the N cells is less than M2, the cell with fault selects to enter the non-controlled rectifying mode, otherwise the system stops; and
if any of the cells have a fault, and if the fault is not an open circuit fault of the bidirectional switching unit and the number of cells in the bypass mode in the N cells is less than M1, the cell with fault selects to enter the bypass mode, otherwise the system stops.

19. A three-phase power system, comprising:
three power modules according to claim 12 connected to three phases of a three-phase power supply in a Y connection manner or an angle connection manner.

20. A method for controlling a three-phase power system, comprising:
configuring three power modules according to claim 12 connected to three phases of a three-phase power supply in a Y connection manner;
when there is a cell operating in the non-controlled rectifying mode in the power module connected to one phase, injecting a zero-sequence voltage into AC ports of the power modules connected to the other two phases.

* * * * *